(12) United States Patent
Ellerbrock et al.

(10) Patent No.: US 6,204,920 B1
(45) Date of Patent: Mar. 20, 2001

(54) OPTICAL FIBER SENSOR SYSTEM

(75) Inventors: Philip J. Ellerbrock, St. Louis; John H. Belk, Bridgeton; Bartley C. Johnson, St. Louis, all of MO (US)

(73) Assignee: McDonnell Douglas Corporation, St. Louis, MO (US)

( * ) Notice: Subject to any disclaimer, the term of this patent is extended or adjusted under 35 U.S.C. 154(b) by 0 days.

(21) Appl. No.: 08/802,400

(22) Filed: Feb. 18, 1997

Related U.S. Application Data

(63) Continuation-in-part of application No. 08/771,607, filed on Dec. 20, 1996, now abandoned.

(51) Int. Cl.[7] ............................................. G01B 9/02
(52) U.S. Cl. .................. 356/345; 356/35.5; 356/352; 356/349; 250/227.13; 250/227.18; 250/227.23; 385/12; 385/14
(58) Field of Search .................. 356/35.5, 345, 356/352, 349; 250/227.13, 227.18, 227.23; 385/12, 14

(56) References Cited

U.S. PATENT DOCUMENTS

| | | | |
|---|---|---|---|
| 5,191,458 | * 3/1993 | Lyons et al. | 359/127 |
| 5,361,130 | 11/1994 | Kersey et al. | 352/345 |
| 5,563,967 | 10/1996 | Haake | 385/12 |
| 5,567,881 | 10/1996 | Myers | 73/629 |
| 5,748,312 | * 5/1998 | Kersey et al. | 356/345 |
| 5,754,293 | * 5/1998 | Farhadiroushan | 365/345 |

OTHER PUBLICATIONS

Measures et al., "Bragg Grating Sensing System . . . for Bridge Monitoring," 1994, SPIE vol. 2294, pp. 53–59.

Brady et al., "Demultiplexing of Fibre Bragg Grating Temperature and Strain Sensors," Sep. 15, 1994, 4 pages.

Kersey, et al., "Multiplexed Fiber Bragg Grating Strain–Sensor System with a Fiber Fabry–Perot Wavelength Filter," Aug. 15, 1993, vol. 18, No. 16, 3 pages.

Measures, et al., "A Structurally Integrated Bragg Grating Laser Sensing System for a Carbon Fiber Prestressed Concrete Highway Bridge," Smart Materials & Structures, 1995, pp. 20–30.

Friebele et al., "Fiberoptic Sensors Measure Up for Smart Structures," May 1994, pp. 165–171.

M.A. Davis et al., "Design and Performance of a Fiber Bragg Grating Distributed Strain Sensor System," May 1995, SPIE vol. 2446, pp. 227–235.

W.W. Morey, et al. "Fiber Optic Bragg Grating Sensors," 1989, SPIE vol. 1169, pp. 98–107.

J.R. Dunphy, et al., "Multi–function, Distributed Optical Fiber Sensor for Composite Cure and Response Monitoring," 1990, SPIE vol. 1370, pp. 16–118.

A.D. Kersey, et al., "Progress Towards the Development of Practical Fiber Bragg Grating Instrumentation Systems," Aug. 7, 1996, SPIE vol. 2829, paper #06, pp. 1–23.

\* cited by examiner

Primary Examiner—Robert H. Kim
Assistant Examiner—Andrew H. Lee
(74) Attorney, Agent, or Firm—Senniger, Powers, Leavitt & Roedel

(57) ABSTRACT

A system such as for sensing strain or temperature of an aircraft and for transmitting information in communication systems. A sensor array includes a first light responsive Bragg grating sensor having a first operating bandwidth and a second light responsive Bragg grating sensor having a second operating bandwidth. Each sensor modifies light provided to it at a wavelength indicative of changes in strain or temperature. The second sensor operates within a bandwidth which is different from the operating bandwidth of the first sensor. A tunable light source such as an LED and tunable etalon provides light for illuminating the first and second sensors, the provided light having a wavelength which varies within a band including the first and second bandwidths. A detecting circuit provides signals representative of light modified by the first and second sensors. A processor processes the representative signals to determine the strain and/or temperature.

19 Claims, 10 Drawing Sheets

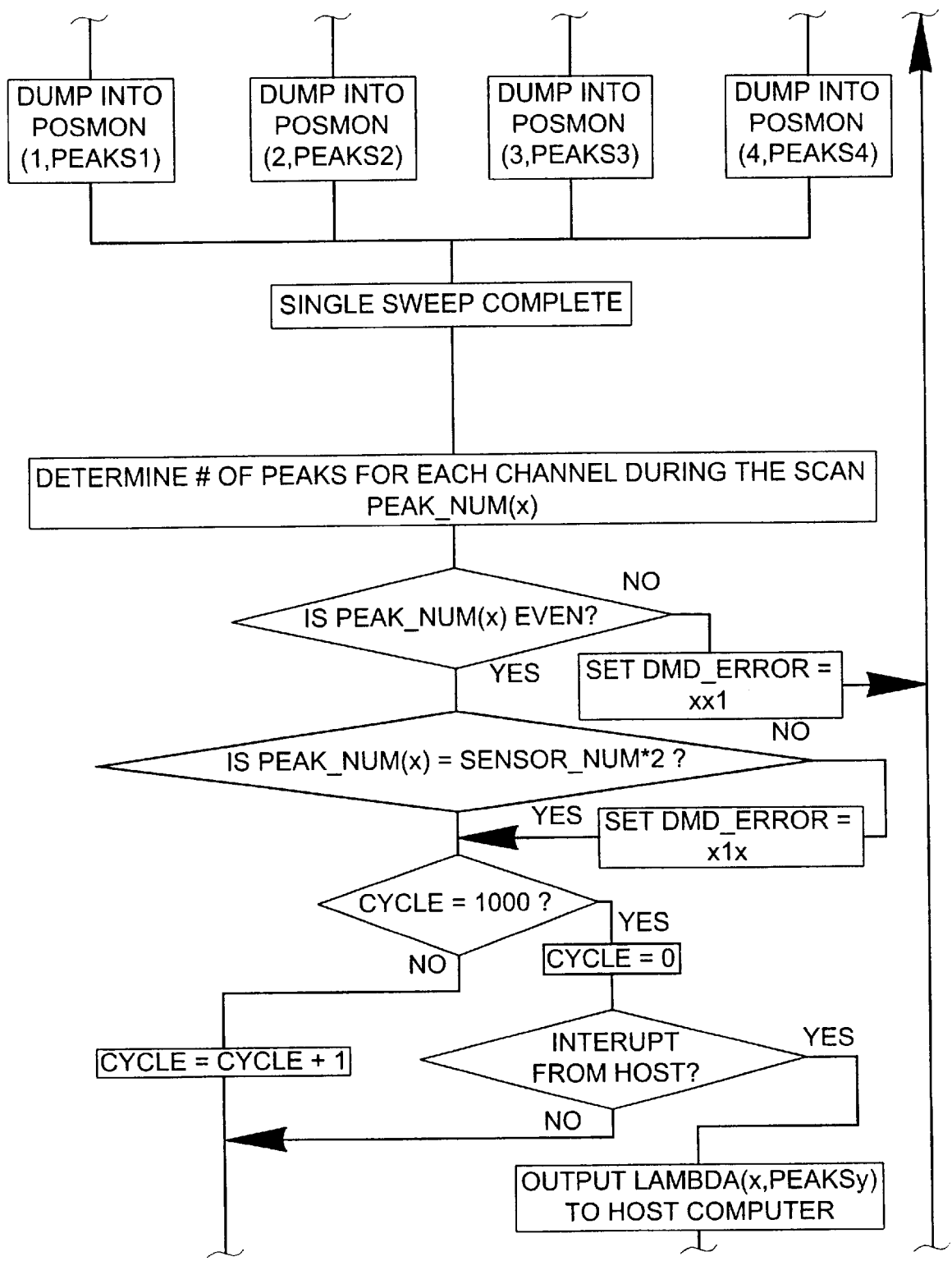
FIG. 4B  CONTINUES FROM 4A
CONTINUES TO 4C

OPTICAL FIBER SENSOR SYSTEM

CROSS-REFERENCE TO RELATED APPLICATION

This application is a continuation-in-part of Ser. No. 08/771,607, filed Dec. 20, 1996, now abandoned.

TECHNICAL FIELD

The invention generally relates to sensing systems and, in particular, an optical fiber sensor system having multiple light responsive sensors for sensing various parameters and for use in communication systems.

BACKGROUND ART

Fiber optic intracore Bragg gratings have been used in prior sensing systems as reliable, localized sensors of strain, temperature and other physical parameters. The wavelength encoding of strain and temperature in these Bragg grating sensors make them suited for monitoring structures to track strain and temperature over periods of time. Such sensors are not affected by electrical interference as compared to electrical based sensors. However, the prior systems which have employed such sensors have been very expensive and inflexible in their ability to detect different parameters. In addition, such prior systems were high in volume and weight (e.g., large and heavy) which made them unacceptable in mobile applications.

An example of such a prior art two channel system employing Bragg grating sensors is illustrated in FIG. 1. Each channel includes a sensor array SA1, SA2 which is embedded in or attached to the structure to be monitored, such as within a concrete deck support girder for a bridge. Each sensor of each array reflects light of a particular bandwidth which is different from the bandwidth of the other sensors in the array. For example, a first sensor of array SA1 may be detecting strain and reflecting light within a bandwidth having a wavelength of 1295–1297 nanometers (nm) whereas a second sensor of sensor array SA2 may be detecting temperature and reflecting light within a bandwidth having a wavelength of 1329–1331 nanometers (nm), the specific wavelength of reflection being related to the strain or temperature of the sensor with changes tracking generally linearly. Consequently, the sensors of each array of each channel must be illuminated by light from a different, separate broad band light source BBLS1 which emits light corresponding to the sensor's reflective operating bandwidth.

Optical fibers transmit the light from the source via a 2×1 coupler to the sensor array and transmit the reflected light from the sensors of the array via the coupler to a tunable filter TF1, TF2 driven by a waveform generator WG which is scanned to detect a narrow band of reflected light. A peak detector PD1, PD2 detects the peak of any reflected light within the narrow band of the filter for each channel. Each peak detector generates a digital pulse representative of the peak of the reflected light. The digital pulses generated during scanning are used as a trigger for the A/D converter and thus are converted to a value which is proportional to a particular wavelength. Knowing the tunable filter's response, the converted values can be identified as an exact wavelength. Using a model of the sensor's relationship of wavelength to a particular parameter, a value based on this parameter can be made.

Such systems have been found to be very expensive, primarily because of the cost associated with the various light sources needed to illuminate each sensor array with light of the appropriate bandwidth and multiple tunable filters to locate the sensors. In addition, the need for various or multiple light sources tends to add the significant weight and volume of such prior art systems which limit the applicability of the system for use in mobile applications or other environments in which a light weight or compact monitoring system is needed or desired.

There is a need for an improved optical fiber sensor system which avoids these prior art deficiencies and would be useful in mobile systems such as systems which monitor the structural integrity of aircraft and systems by monitoring parameters indicating safe conditions such as structural monitors for bridges. In addition, there is a need for an improved optical fiber sensor system which could be used in telecommunications.

DISCLOSURE OF INVENTION

The invention meets the above needs and overcomes the deficiencies of the prior art by providing an optical fiber sensor system which uses only one light source in combination with multiple arrays of sensors. The invention accomplishes this by employing a tunable light source which is multiplexed to address the sensors of the multiple arrays. The tunable light source of the invention reduces system weight and size so that systems according to the invention meet the need for an optical fiber sensor system which has a reduced weight and a miniaturized package of reduced cost. This invention is also directed to meeting the need for such a system which employs a single light source so that its cost is reduced without a loss in flexibility or accuracy.

In particular, the inventors have taken advantage of the advent of brighter low cost tunable light sources and have addressed the cost problem at the source (i.e., in the section of the layout prior to the light reaching the sensors) rather than at the detector (i.e., in the section after the light leaves the sensors on its way to the detectors), as most prior art has done. This invention provides an optical fiber sensor system which uses one tunable source of light to all the sensors. The single tunable source allows the elimination of many tunable filters located before the photodetectors and peak detectors as in the prior art. This results in a size and weight savings as well as an increase in reliability.

The implementation of a single, tunable light source now permits optical systems to be used in mobile environments, such as aircraft, while maintaining flightworthy system specifications. As a result, single light source distributed systems according to the invention prove useful in monitoring various parameters as well as in communications.

Even though the system of the invention employs a single tunable light source, the invention provides light to a plurality of sensors operating within different bandwidths. This overcomes the limitations of the prior art systems and provides a flexibility not previously recognized in the prior art. Consequently, the invention becomes particularly useful in high performance, low cost Bragg grating sensor systems.

Another advantage of the optical fiber sensor system of the invention is that it allows sensor systems to employ Bragg grating sensors in combination with a digital signal processor. Because the processor according to the invention need only process a reduced number of data points per trace, the processor quickly determines peaks so that the system is higher in speed.

The low cost and low weight advantages of the optical fiber sensor system of the invention provide a system that is useful in monitoring structural integrity over time. In particular, systems of the invention provide substantially continuous monitoring of vibration, strain, wear and other parameters. Furthermore, such parameters can be monitored in fixed structures such as bridges as well as mobile structures such as aircraft.

The adaptability of the invention also provides an optical fiber sensor system for use in telecommunications such as substation to substation communication. The flexibility of the invention also has advantages in that it provides a system which can meet a rising market need for more sensors per system while being useful in both commercial and military markets. In addition, the invention provides an optical fiber sensor system which uses simple strain gauges and provides full health monitoring of structural integrity of stationary as well as mobile systems.

In one form, the invention comprises a sensing system having a first sensor, a tunable light source, a detecting circuit and a processor. The first sensor has a first operating bandwidth and modifies light provided to it at a wavelength representative of or indicative of a first sensed parameter. The tunable light source provides light which illuminates the sensor. This provided light has a wavelength which varies over the first bandwidth. The detecting circuit provides a signal representative of light modified by the first sensor. The processor processes the representative signals provided by the detecting circuit to determine the first parameter being monitored by the first sensor.

In another form, the invention comprises a light source for a sensing system having a first sensor array including a first and second light responsive sensor. The first light responsive sensor has a first operating bandwidth so that the first sensor modifies light provided to it at a wavelength representative of or indicative of a first sensed parameter. The second light responsive sensor has a second operating bandwidth which is different from the first operating bandwidth. The second sensor modifies light provided to it at a wavelength in relation to a second sensed parameter. The light source includes a tunable light source providing light to illuminate the sensor array. This provided light has a wavelength which varies over the first and second bandwidths. The light source also includes a detecting circuit for providing a signal representative of light modified by the first and second sensors. A processor is included for processing the representative signals provided by the detecting circuit to determine the first and second parameters being monitored by the first and second sensors, respectively.

In another form, the invention comprises a sensing system including first and second light responsive sensors. The first light responsive sensor has a first operating bandwidth so that the first sensor modifies light provided to it at a wavelength in relation to a first sensed parameter. The second light responsive sensor has a second operating bandwidth. The second bandwidth is different from the first operating bandwidth. The second sensor modifies light provided to it at a wavelength in relation to a second sensed parameter. The system also includes a light source which provides light and a tunable etalon which receives the provided light and provides illuminating light to the sensors. The illuminating light has a wavelength which varies over the first and second bandwidths. A detecting circuit provides a signal representative of light modified by the first and second sensors. A processor processes the representative signals provided by the detecting circuit to determine the first and second parameters being monitored by the first and second sensors, respectively.

In another form, the invention comprises a detecting circuit for detecting modified light. A differentiator determines the peak of the modified light. A threshold detector acts as a noise rejection system by establishing a minimum amplitude of the modified light. A logic circuitry responsive to the differentiator and the threshold detector generates a signal representative of the peak wavelength of the modified light.

Other objects and features will be in part apparent and in part pointed out hereinafter.

BRIEF DESCRIPTION OF DRAWINGS

FIGS. 4A, 4B and 4C are a flow chart illustrating operation of the digital signal processor of the optical fiber sensing system according to the invention.

Corresponding reference characters indicate corresponding parts throughout the drawings.

BEST MODES FOR CARRYING OUT THE INVENTION

Figure 2:
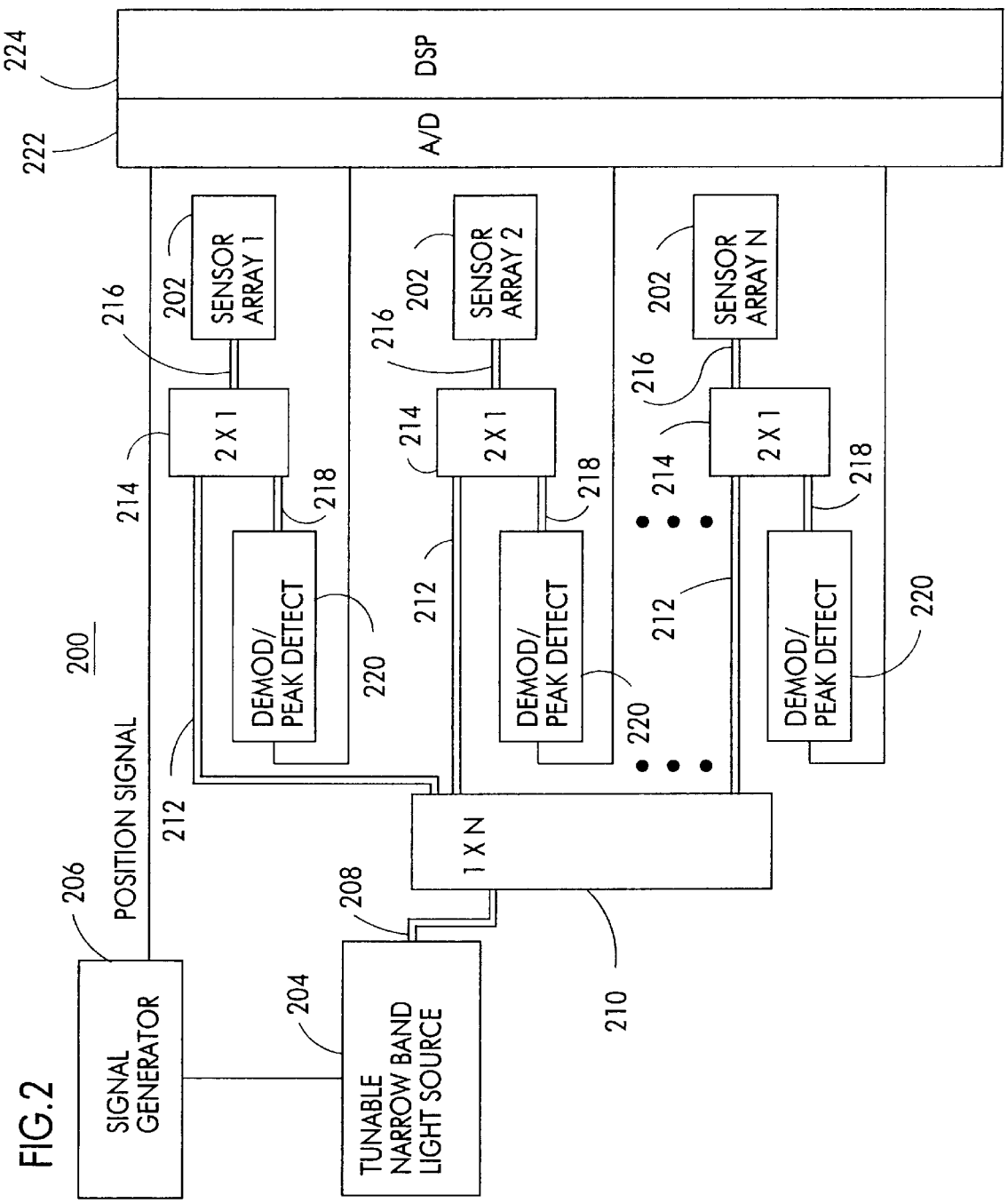
FIG. 2 is a block diagram of one preferred embodiment of an N channel optical fiber sensing system according to the invention including N arrays illuminated by a single, narrow band light source.

Referring to FIG. 2, a block diagram of one preferred embodiment of an optical fiber sensing system 200 according to the invention including N sensor arrays 202 is illustrated. Although the system 200 is illustrated as having N channels, it is contemplated that it may have one or more channels. Preferably, each array 202 is a plurality of Bragg grating sensors either connected in series (in line) or in parallel.

Each sensor of the array 202 is configured to transmit data or sense a particular or different parameter of the device being monitored at various locations. For example, if the system 200 is monitoring an aircraft, a first sensor of array 202 may be a Bragg grating sensor which detects strain at a first location; a second sensor of array 202 may be a Bragg grating sensor which detects strain at a second location; a third sensor of array 202 may detect temperature and so on. It is also contemplated that Bragg sensors may be used to detect other parameters, such as corrosion or transmit data as part of a communication system. "Different parameters" also means that the same parameter, such as strain, may be sensed at different locations. Deformation, deflection, load distribution, corrosion or other environmental degradation may also be detected.

Since the sensors are detecting different parameters or similar parameters at different locations, the operating range of each sensor of a particular array is configured to correspond to the appropriate parameter. The first sensor has a first operating bandwidth and modifies light provided to it so that the modified light has a wavelength which is indicative of and shifts in relation to the first parameter which it is sensing. The second sensor has a second operating bandwidth and modifies light provided to it so that the modified light has a wavelength which shifts in relation to the second parameter which it is sensing. The modified light may be light which is reflected by the sensor or may be light which is transmitted through the sensor. In either case, the reflection/transmission band is shifted in wavelength. As used herein, modified light means reflected or transmitted light. For convenience, the invention will be described with respect to reflected light. It is contemplated that the invention may employ transmitted light so that reflected light means reflected or transmitted light in the following description of the invention.

Each sensor array 202 may be configured to operate in a unique bandwidth which best accommodates the parameters which the particular sensor array is detecting. Although each array may be a combination of the same sensors, it is contemplated that the sensors used in an array may vary from array to array. In general, it is contemplated that the bandwidths of at least two sensors of a particular array may be mutually exclusive. For example, the operating bandwidth of the first sensor of sensor array 1 could be different than the operating bandwidth of the second sensor of sensor array 1.

To illuminate each sensor of each array 202 with light within its operating bandwidth, a tunable narrow band light source 204 is employed (see FIG. 2). The tunable light source could be a filtered broad band light source, such as an LED filtered by a tunable etalon, or could be a wavelength tunable laser. The laser, having higher power per unit bandwidth, would have signal-to-noise advantages in systems containing large numbers of sensors. When the single light source 204 is a laser, it is preferably controlled by a laser wavelength controller responsive to a signal generator 206 which instructs it to sweep the light wavelength over all the operating bandwidths of all the sensors of the arrays 202. In particular, the output light of light source 204 is initially provided by an optical fiber 208 to a 1XN spliceless distributed coupler array 210 which distributes the light with little attenuation.

The distributed output light is then provided to each of the N channels of the system 200 by optical fibers 212 which supply the light to a 2×1 coupler array 214 which supplies the light to the sensor arrays 202 via optical fibers 216. (Alternatively, a 2×2 coupler may be used and the second output may be terminated or connected to a separate sensor array.) The light reflected by the sensors of the arrays 202 is then returned along the optical fiber 216 to the 2×1 coupler 214 where it is divided and transmitted by the optical fiber 212 and by the optical fiber 218, the latter of which is connected to a detecting circuit such as a demodulator and peak detector 220. The demodulator and detector 220 monitors the reflected light to determine the particular parameters which are being sensed. This information is provided in the form of a digital pulse used as a conversion trigger to an analog to digital (A/D) converter 222 which converts the analog signal from a position monitor (not shown) of the tunable source 204 into a corresponding digital value for processing by a digital signal processor (DSP) 224.

Figure 3:
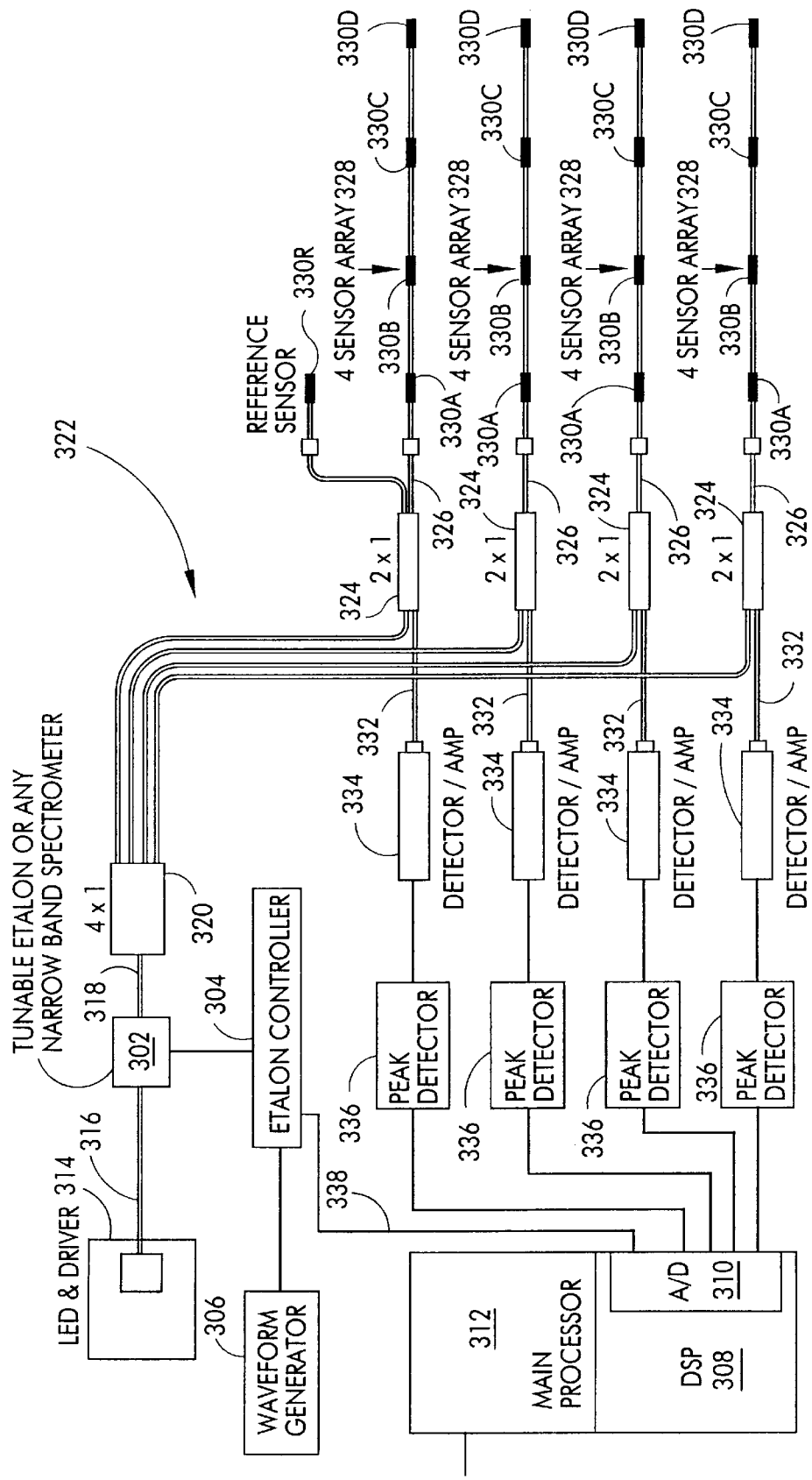
FIG. 3 is a schematic illustration of one preferred embodiment of a four channel optical fiber sensing system according to the invention including four arrays of four sensors each illuminated by a single light source filtered by a tunable etalon.

FIG. 3 is a schematic illustration of one preferred embodiment of an optical fiber sensing system according to the invention having four (4) channels. In this embodiment, the electro-optics consist of a source, a tunable Fiber Fabry-Perot (FFP) filter, a coupler network and a peak detection system. A one (1) milliwatt 1300 nm super luminescent diode (SLD) having a full width half maximum (FWHM) of 36 nm may be used as a broadband light source. The light passes through the electrically tunable FFP filter with an FWHM of 0.4 nm. The combination of the SLD and the FFP act as a narrow band tunable source which is transmitted through a fiber optic coupler to each of the fiber optic sensor arrays. The sensor arrays are scanned by the tunable FFP which is driven by a triangular waveform. This excitation sweeps the filter's narrow pass band through its free spectral range (e.g., 41 nm). The fiber optic Bragg grating sensors on the array respond to the FFP's sweep by reflecting narrow (e.g., less than 0.2 nm FWHM) bands of light. These signals pass back through the coupler to the detector where the peaks of the sensor's response are detected.

A tunable etalon 302 or any narrow band spectrometer may be used to control the wavelength of the light source. The tunable etalon 302 is controlled by an etalon controller 304, such as one which receives a triangular waveform from a waveform generator 306. Preferably, the waveform generator 306 provides a command signal which causes the tunable etalon 304 to sweep back and forth across the combined operating bandwidths of the sensors.

Light is transmitted to the etalon 302 by a light emitting diode and driver 314 (such as a laser diode or a super luminescent diode (SLD)) via optical fiber 316. The etalon 302 provides a narrow bandwidth of light via optical fiber 318 to a 4×1 spliceless distributed coupler array 320 which in turn supplies the output light to each of the four channels. In particular, optical fibers 322 carry the narrow band light to each of four 2×1 coupler arrays 324 which supply the light via optical fibers 326 to each of four arrays 328. Each sensor array 328 comprises a string of four serially multiplexed Bragg grating sensors 330A–330D. Each sensor 330 of a particular array is uniquely interrogated at a rate of about 1 kilohertz or more having a resolution of at least 5 microstrains RMS, for example.

When sensor 330 is interrogated by light having a wavelength within its operating bandwidth, the sensor reflects light back through the optical fiber 326 to the coupler array 324 where the reflected light is provided to a respective optical fiber 322 and to a second optical fiber 332 which transmits the light to a detector/amplifier 334. The signal generated by the detector/amplifier 334 is provided to a peak detector 336 which then provides a trigger signal at the peak of the signal from the detector/amplifier 334 which represents the magnitude of the reflected light. An analog signal (provided via a line 338) representative of the wavelength of the transmitted/reflected light is converted to a digital signal by the A/D converter 310 in response to the trigger signal from the peak detector 336. The converted digital signal indicates the wavelength of the reflected light and is used in processing by the DSP 308 and the main processor 312. The processor 312 monitors the waveform provided by the tunable etalon position monitor 302 via line 338. Since this waveform dictates the wavelength of light being transmitted by the tunable etalon 302, the processor 312 knows the wavelength of light being transmitted at any instant in time. Since each sensor 330A–330D responds to and reflects light of a unique wavelength, at any instant in time the light transmitted by etalon 302 will match only one of the operating bandwidths of sensors 330A–330D of each particular array 328. Therefore, a signal provided by the detector/amplifier 334 and the peak detector 336 can be generated only by the sensor which has an operating bandwidth which corresponds to the bandwidth of the transmitted light.

As an example, suppose the sensors 330 have the following operating bandwidths as specified in Table 1:

| SENSOR | OPERATING BANDWIDTH |
|---|---|
| 330A | 1296 ± 5 NM |
| 330B | 1308 ± 5 NM |
| 330C | 1318 ± 5 NM |
| 330D | 1330 ± 5 NM |

Also, suppose that each of the sensors 330A–330D is monitoring strain of a tank by being bonded to the tank using an epoxy paste and drawn down to the tank using a vacuum bag technique. Also suppose that strain sensor 330C is reflecting light at a wavelength of 1318.4 nm. Also, assume that sensor 330C reflects light of 1318.0 nm at 0 microstrains and that sensor 330C reflects light of 1319.0 nm at 1000 microstrains (which is equivalent to about one nanometer change in wavelength). As the etalon 302 sweeps through a bandwidth of 1291–1331 nm and transmits light of varying wavelength, at some instant it will be transmitting light of 1318.4 nm. The processor knows the transmitting wavelength by monitoring the output of a position monitor within the tunable etalon 302 via line 338. When light of 1318.4 nm is transmitted, the detector/amplifier 334 and the peak detector 336 of channel 1 will generate a pulse. Since the wavelength of 1318.4 nm falls within the operating wavelength of only sensor 330C, the processor 312 can determine that sensor 330C is at a strain of 400 microstrains which corresponds to 1318.4 nm. (As is known in the art, the reflecting wavelength varies approximately linearly with strain so that the processor can determine the strain of sensor 330C.) Since 1 nm is approximately equal to 1000 µE (microstrains), each sensor can measure about +/− 5000 µE without overlap. Laboratory testing showed a linear response from −5000 µE through to +5000 µE for each sensor from 1296 nm to 1330 nm at room temperature. The timing of the various signals will be described below in greater detail with regard to FIGS. 6 and 7.

Due to the thermal nature of the tunable light sources such as the FFP, the filter bandwidth and, consequently, the wavelength of light being transmitted may vary depending on temperature. Therefore, it may be desirable to include an additional channel supplying the light to and from a reference Bragg sensor 330R. This reference sensor may be maintained at a constant temperature (e.g., 85° F.) so that the wavelength response of this reference sensor 330R provides a reference to is which the response of all other sensors 330A–330D may be compared.

Although FIGS. 2 and 3 illustrate that the demodulator and peak detector are hardware, it is contemplated that the demodulator and peak detector may be implemented by software and accomplished by processing either within the digital signal processor 308 or the main processor 312. Because of possible limitations relating to processor speed, it may be preferable to employ hardware. As indicated below, the peak detection can be performed on centroid, midpoint or amplitude techniques.

Figure 4A:
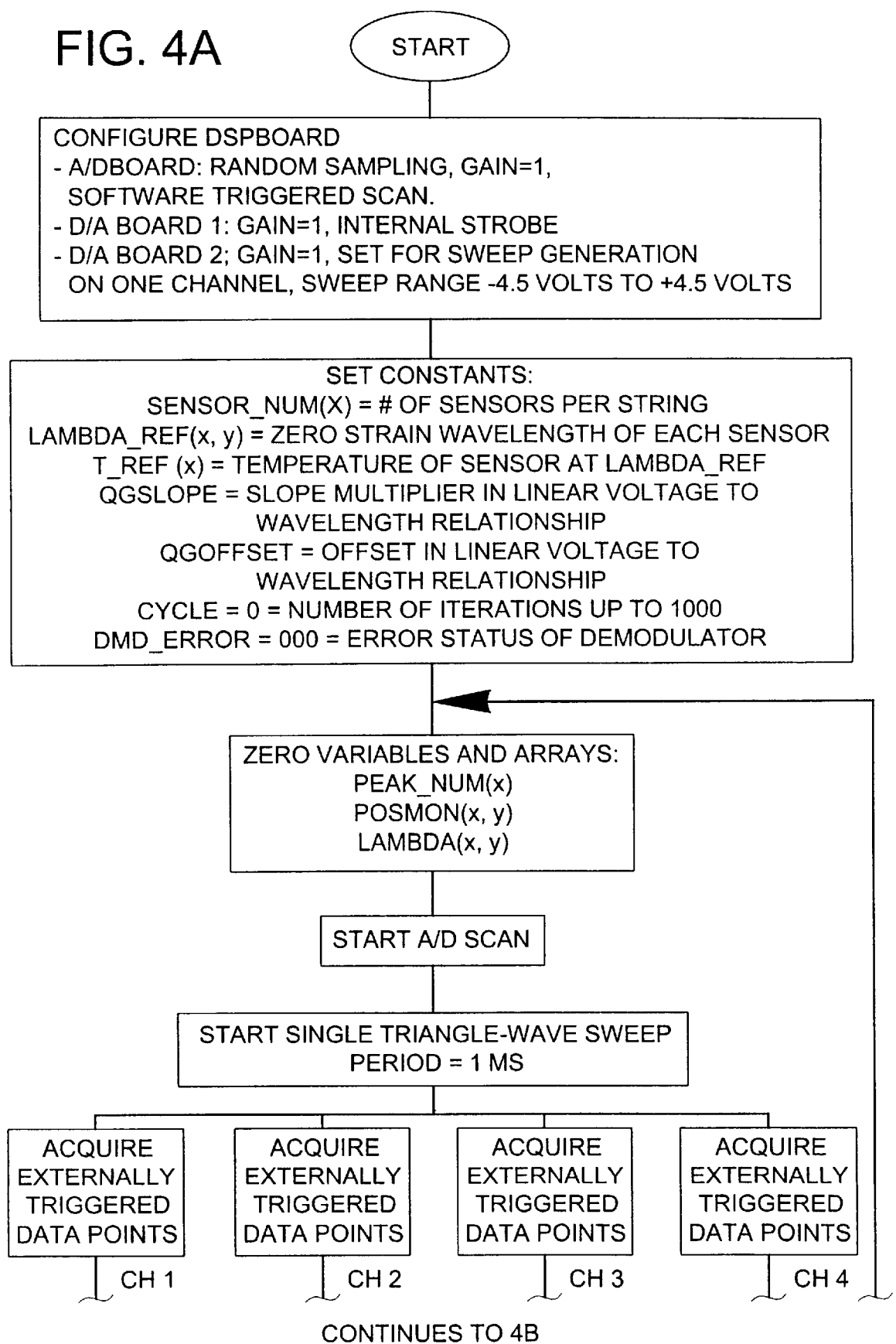
Figure 4C:
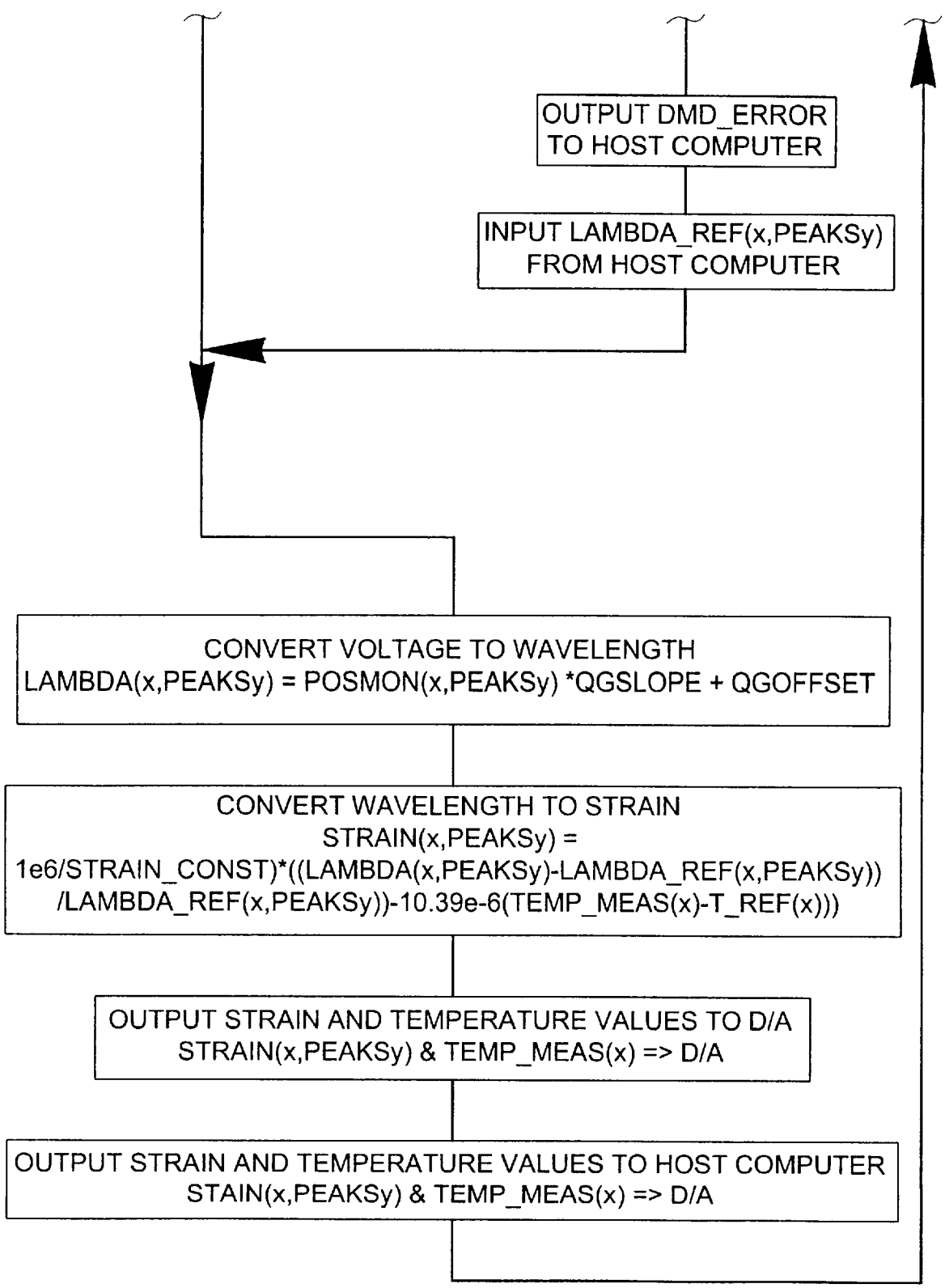

FIGS. 4A, 4B and 4C are a flow chart illustrating operation of the digital signal processor 312 of the optical fiber sensing system 200 according to the invention. FIGS. 4A and 4B specify the steps the processor 224 performs to complete one sweep and retrace. In particular, the first step configures the DSP board, the second step sets up the constants, the third step initializes the arrays and the remaining steps trigger the reading of eight points per sensor.

During each sweep and retrace, the processor 312 executes the steps of FIGS. 4B and 4C to dump data into the main processor to determine the value of the peaks. In particular, the middle portion of FIB. 4B is an error check whereas the lower portion of FIG. 4B and the upper portion of FIG. 4C buffers the memory in cycles so that the bus is not constantly tied up.

After each peak is detected, the last four steps of FIG. 4C determine the value of the parameters. In particular, the conversion equations are executed to convert position to wavelength and to convert wavelength to the parameter value (e.g., strain). These steps can be executed in about 100 microseconds or less so that the digital signal processor 308 need only process a reduced number of data points per trace to determine peaks so that the system 200 of the invention is high in speed. If the steps are executed in times of greater than 100 microseconds, additional processing power may be needed.

Figure 5A:
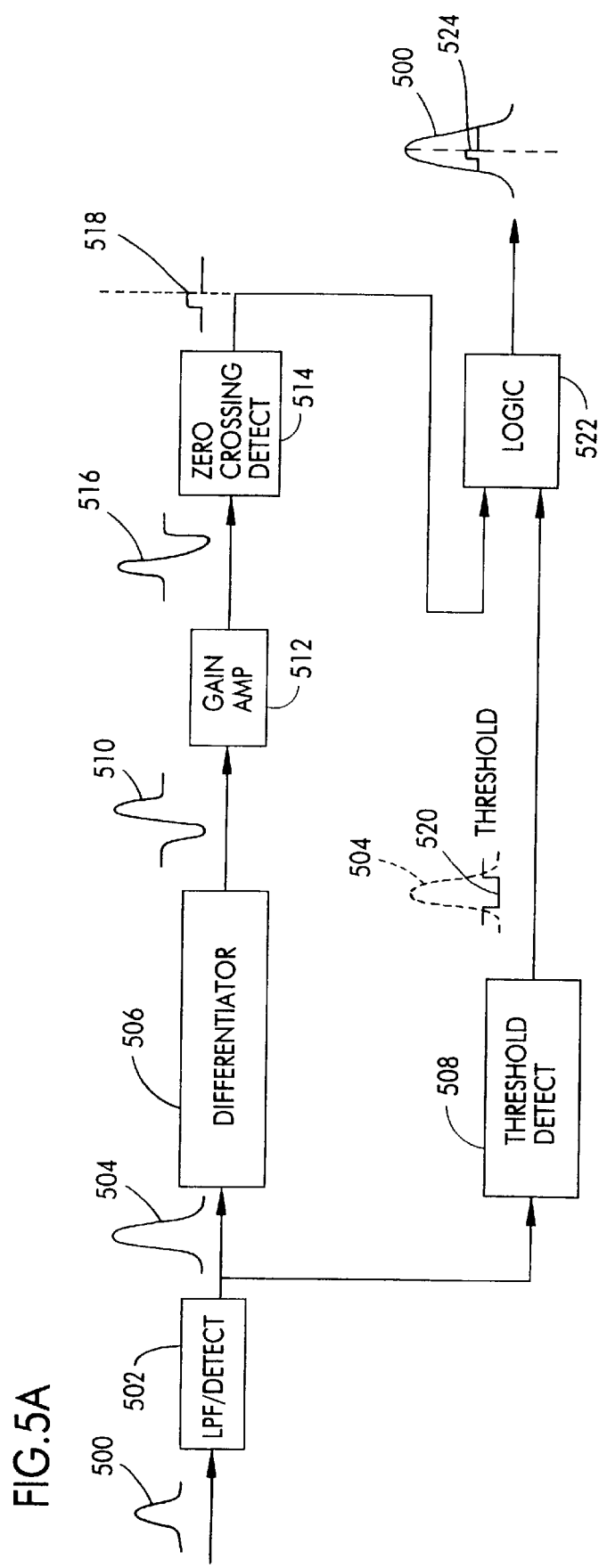
FIG. 5A is a block diagram of one preferred embodiment of a demodulator and peak detector of the optical fiber sensor system of FIGS. 2 and 3 according to the invention.
Figure 5B:
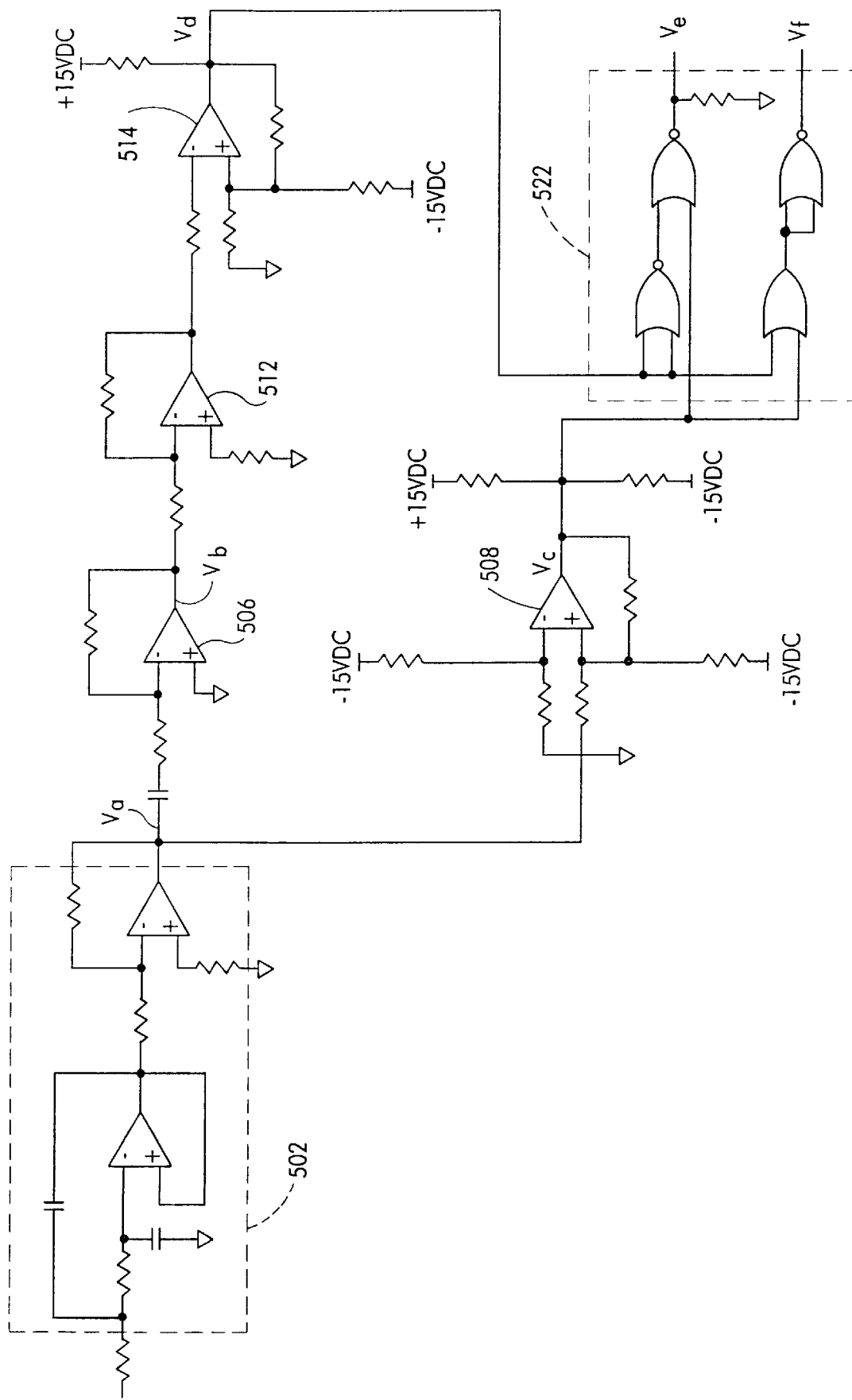
FIG. 5B is a schematic diagram of one preferred embodiment of the demodulation and peak detector of the optical fiber sensor system according to the invention.

FIGS. 5A and 5B illustrate one preferred embodiment of the demodulator and peak detector 220 of FIG. 2 and of the detector/amplifier 334 and peak detector 336 of FIG. 3. After a photodetector, not shown, converts the reflected light provided by optical fibers 218, 332 into a corresponding signal 500, the signal 500 is filtered by a low pass filter (LPF) and detected by an amplifier illustrated as LPF/detect circuit 502 to create a signal 504 which is then provided simultaneously to a differentiator circuit 506 and a threshold detector 508. The differentiated signal 510 is amplified by amplifier 512 and zero detector 514 detects the zero crossing to provide signals 516, 518, respectively.

While this differentiation and amplification is occurring, the threshold detector 508 detects whether the signal 504 exceeds a threshold resulting in a digital output 520. Therefore, detector 508 rejects false peaks or noise by determining a minimum amplitude of the reflected light. A logic circuit 522 simultaneously combines signals 518 and 520 to provide a peak signal 524 representative of the peak of signal 500.

Figure 6:
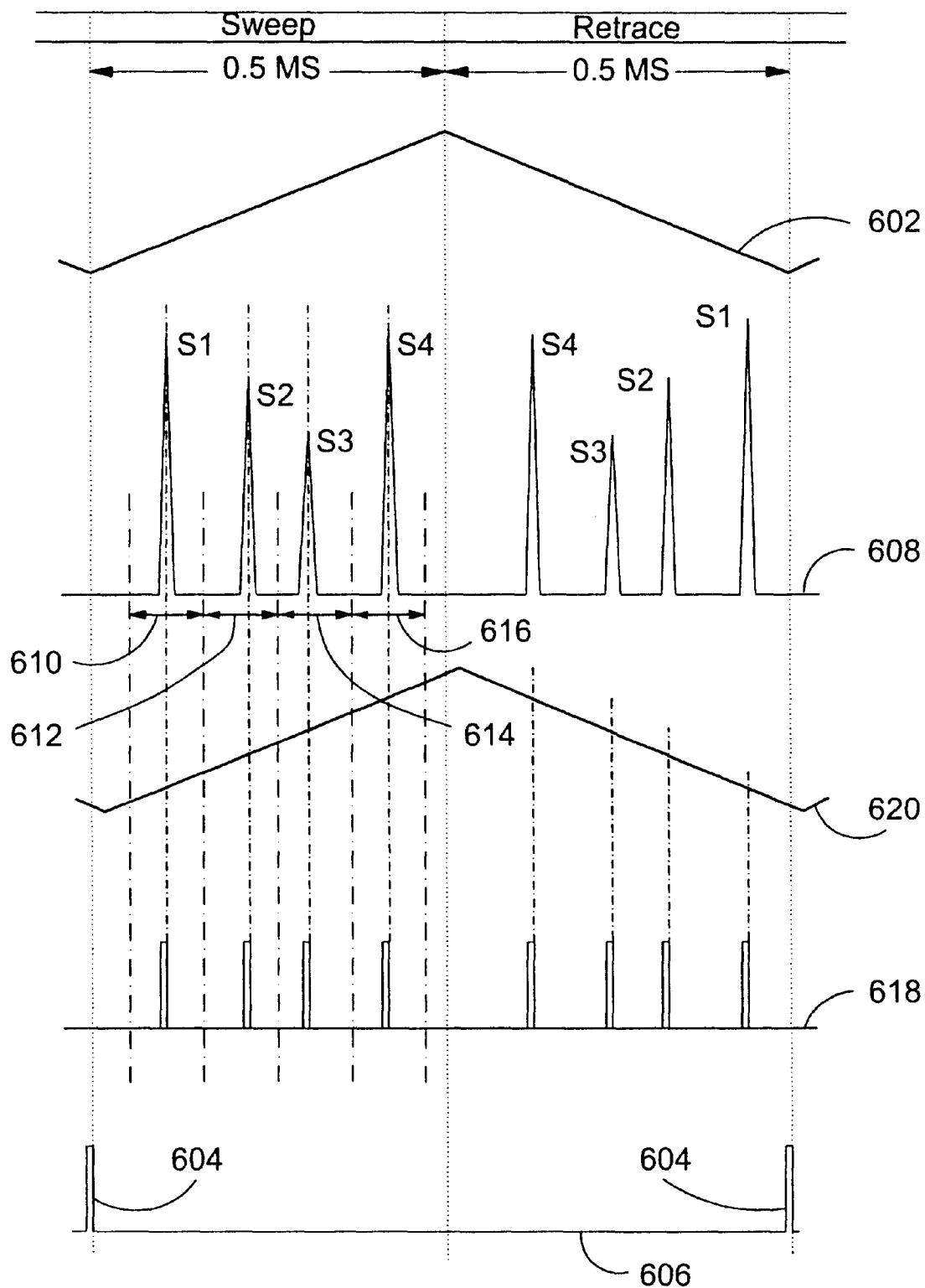
FIG. 6 is a timing diagram of the system signals generated during a sweep and retrace of the system according to the invention.

FIG. 6 is a timing diagram of various waveforms of the signals of the invention. Waveform 602 represents the triangular signal generated by the signal generator 206 and the waveform generator 306 for causing the sweep and retrace of the tunable narrow band light source 204 and the tunable etalon 302, respectively. In a synchronous mode, the waveform 602 is generated in response to the trailing edge of a pulse 604 of a waveform generator trigger signal 606 which may occur at a frequency of 1000 per second, depending on the processing power of the DSP. Peaks S1–S4 of the waveform 608 represent the signals 500 generated by the photodetector (not shown) in response to the light reflected by the sensors. Arrow sets 610, 612, 614 and 616 indicate the strain range (operating bandwidth) for each of the four sensors 330A–330D. Waveform 618 shows the peak detect signals 524 generated by the detectors 220, 336. Waveform 620 is generated by a position monitor (not shown) within the tunable etalon 302 and may be used by the DSP in place of the waveform 602 to indicate the wavelength of the light being transmitted by the tunable etalon. Note that the waveform 620 slightly lags the waveform 602 and, in some cases, may be a more accurate indication of the wavelength. The detector acts as a noise rejection system by establishing a minimum amplitude of the reflected light and thereby avoids inaccuracies caused by noise. Alternatively, the system 100 may be operated in an asynchronous mode in which the waveform generator 306 produces a trigger signal indicating the beginning of a sweep.

In one embodiment, the demodulator's triangular waveform generator was operated at 1000 cycles per second (Hz) such that the fiber optic sensors are scanned at a rate of 1000 samples per second (SPS), thus its maximum temporal bandwidth. The resolution achievable was 0.8 $\mu$E/sq.rt.Hz. A rate of 50 SPS was all that was necessary during flight testing so a resolution of +/−3 $\mu$E was possible by using averaging techniques.

The strain relationship for a Bragg grating sensor embedded into an epoxy material is as follows:

$$E_{(\mu e)} = \frac{1 \times 10^6}{K_\epsilon} \left[ \left( \frac{\lambda_m - \lambda_r}{\lambda_r} \right) - K_T(T_m - T_r) \right]$$

where $K_\epsilon$ is the strain constant of a Bragg sensor embedded into the material (0.7796);
$K_T$ is the temperature constant of a Bragg sensor embedded into the material (10.39×10$^{-6}$ or 7.89×10$^{-6}$ in free air);
$\lambda_m$ is the measured wavelength;
$\lambda_r$ is the reference wavelength;
$T_m$ is the measured temperature at the sensor location; and
$T_r$ is the reference temperature at the sensor location.

In order to determine the reference wavelength and the reference temperature, the wavelength and temperature of a sensor is simultaneously sampled after being bonded to the material and this measurement is related to the current known strain of the material at the sensor location when the sample is taken. This valve is then recorded as the calibrated reference value. All measurements of the sensor from then on are referenced to this sensor.

Similarly, the strain relationship for a Bragg grating sensor embedded into an epoxy material is as follows:

$$T_m = \frac{1}{K_{fa}} \left( \frac{\lambda_m - \lambda_r}{\lambda_r} \right) - T_r$$

where $K_{fa}$ is the temperature constant of a Bragg sensor in free space (7.89×10$^{-6}$);
$\lambda_m$ is the measured wavelength;
$\lambda_r$ is the reference wavelength; and
$T_r$ is the reference temperature at the sensor location.

The reference wavelength is determined in the same manner as noted above with respect to the strain relationship.

Figure 7:
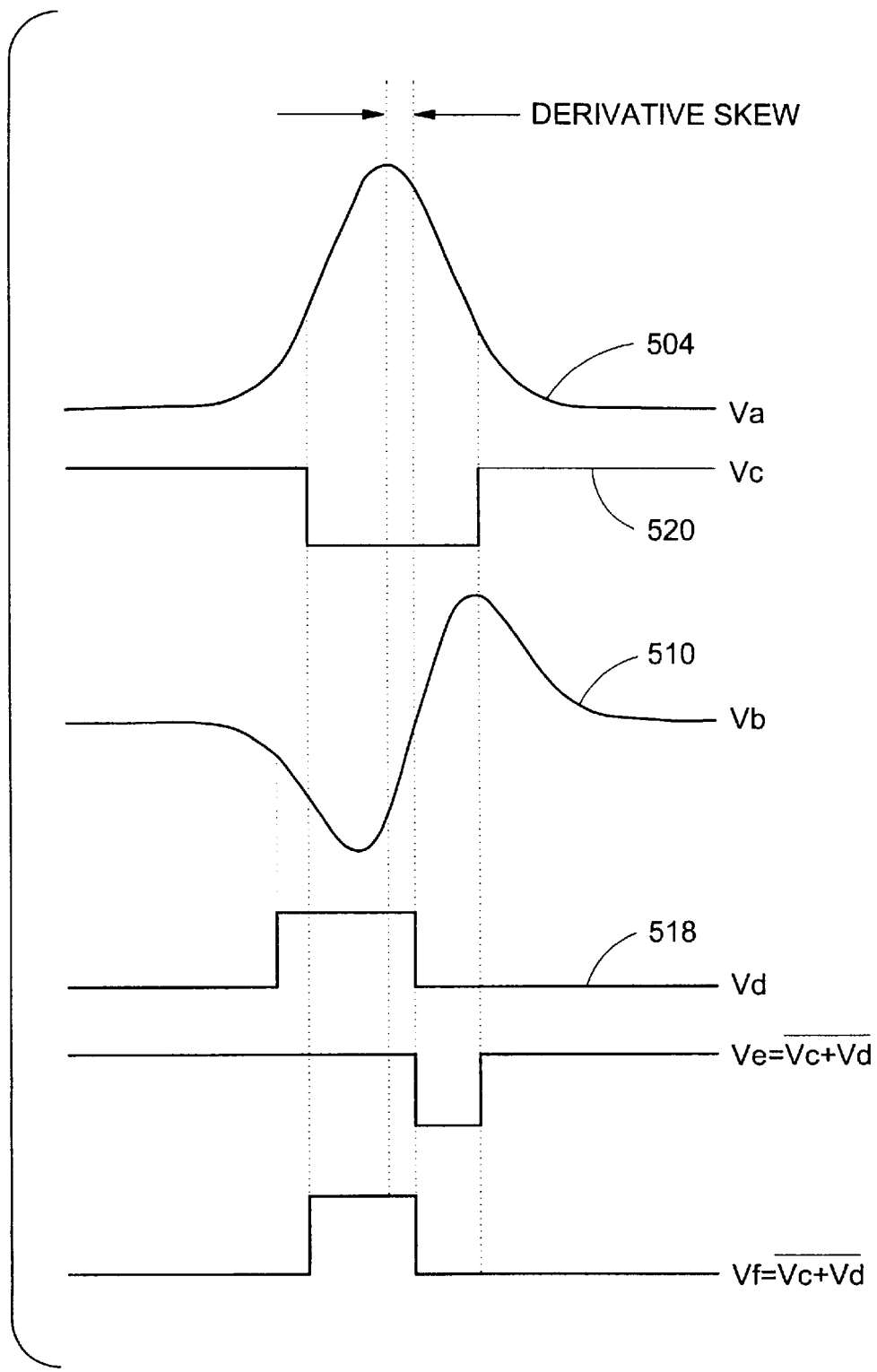
FIG. 7 is a timing diagram of the relationship of the signals generated during a sweep and retrace of the system according to the invention.

FIG. 7 illustrates the timing of the demodulator peak detect circuitry. In particular, these waveforms correspond to the labeled values illustrated in FIGS. 5A and 5B.

Although the system of the invention has been described above with particular regard to a Bragg sensor system for monitoring temperature, those skilled in the art will recognize other applications of the system. For example, the system of the invention may be used to monitor building or bridge stresses or the stress or strain of any other stationary structure. In addition, the system of the invention is useful on aircraft or other mobile devices to monitor structural integrity or vibration.

Figure 1:
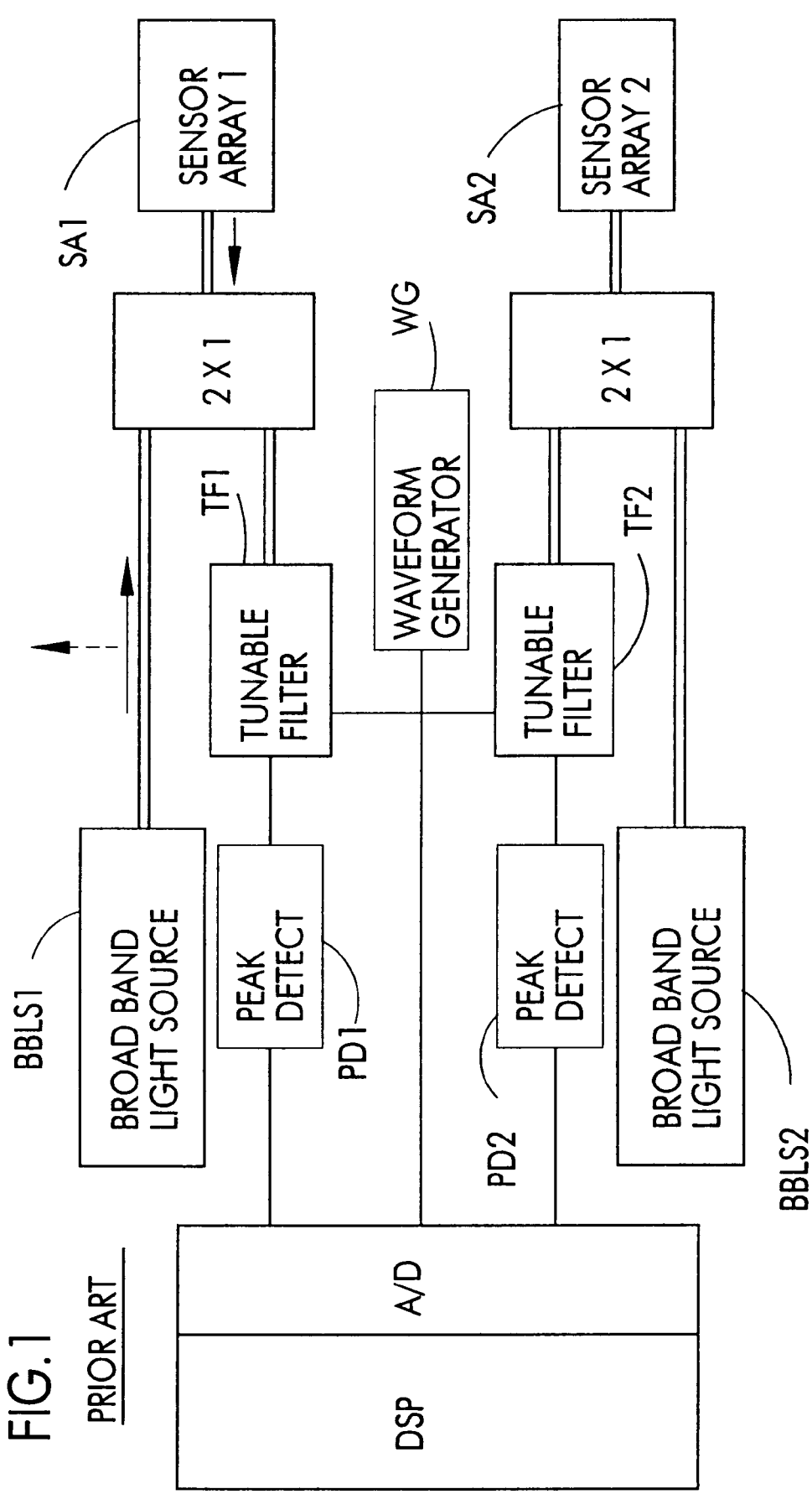
FIG. 1 is a block diagram of a prior art two channel Bragg grating fiber laser sensing system based on passive wavelength demodulation.

Also, those skilled in the art will recognize that various other components may be used as part of the system according to the invention. For example, the coupler arrays may be replaced by other devices which distribute and/or collect light. The detector may be as described in FIGS. 5A and 5B or it may be replaced by prior art detectors such as illustrated in FIG. 1.

Also, those skilled in the art will recognize that the system of the invention may be used as part of or in combination with other systems, such as communication systems.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A system comprising:
a first light responsive sensor having a first operating bandwidth wherein the first sensor modifies light provided to it at a wavelength indicative of a first sensed parameter;
a second light responsive sensor having a second operating bandwidth wherein the second operating bandwidth is different from the first operating bandwidth and wherein the second sensor modifies light provided to it at a wavelength indicative of a second sensed parameter;
a tunable light source providing light illuminating the first and second sensors, the light provided to each of the first and second sensors having a wavelength which varies over the first and second bandwidths;
a detecting circuit for providing a signal representative of light modified by the first and second sensors; and
a processor for processing the representative signals provided by the detecting circuit to determine the first parameter being monitored by the first sensor.

2. The system of claim 1 wherein the tunable light source comprises:
a light source providing output light having a wide bandwidth;
a tunable spectrometer receiving the output light from the light source and providing to the sensors light having a narrow bandwidth which varies according to a control signal; and
a controller providing the control signal to the spectrometer and causing the bandwidth of light provided by the spectrometer to vary to include the first and second operating bandwidths of the first and second sensors of the first array.

3. The system of claim 2 wherein the light source comprises a tunable laser diode, and wherein the controller comprises a laser wavelength controller and a waveform generator providing a signal to the wavelength controller which causes the laser light wavelength to vary over the first and second bandwidths.

4. The system of claim 2 further comprising:
a second sensor array including a third light responsive sensor having the first operating bandwidth, the third sensor modifying light provided to it at a wavelength indicative of the first sensed parameter and a fourth light responsive sensor having the second operating bandwidth, the fourth sensor modifying light provided to it at a wavelength in relation to the second sensed parameter; and
a coupler transmitting the light provided by the spectrometer to the first and second sensor arrays.

5. The system of claim 4 wherein the first, second, third and fourth sensors comprise first, second, third and fourth Bragg grating sensors, respectively, and wherein the coupler includes:
 a coupler array for receiving the light provided by the spectrometer;
 a first optical fiber for transmitting the light from the coupler array to the first sensor array, said first and second Bragg grating sensors being connected to the first optical fiber for receiving light transmitted by the first optical fiber and for transmitting light modified by the first and second sensors;
 a second optical fiber for transmitting the light from the coupler array to the second sensor array, said third and fourth Bragg grating sensors being connected to the second optical fiber so that the sensors receive light transmitted by the second optical fiber and so that the second optical fiber transmits light modified by the third and fourth sensors; and
 wherein the detecting circuit detects the light modified by the sensors and transmitted by the first and second optical fibers.

6. The system of claim 5 wherein the light source comprises an LED and driver, wherein the tunable spectrometer comprises a tunable etalon, wherein the controller comprises an etalon controller controlling the tunable etalon and a waveform generator providing a signal to the etalon controller which causes the etalon to transmit light which varies over the first and second bandwidths, and wherein the coupler array comprises a spliceless distributed coupler array, and wherein the detecting circuit comprises:
 a first demodulator and peak detector for detecting light modified by the first and second sensors and for determining the peak wavelength of such light modified and providing signals representative thereof; and
 a second demodulator and peak detector for detecting light modified by the third and fourth sensors and for determining the peak wavelength of such modified light and providing signals representative thereof.

7. The system of claim 6 wherein the first demodulator and peak detector comprises:
 a differentiator for determining the peak of the light modified by the first and second sensors;
 a threshold detector for determining an amplitude of the light modified by the first and second sensors; and
 logic circuitry responsive to the differentiator and the threshold detector for generating a signal representative of the peak wavelength of the light modified by the first and second sensors.

8. The system of claim 7 wherein the processor is responsive to the signal generator whereby the processor differentiates between the signals provided by the sensors based on the wavelength of light provided by the light source as controlled by the generator.

9. The system of claim 2 further comprising:
 a second sensor array including a third light responsive sensor having the first operating bandwidth, the third sensor modifying light provided to it at a wavelength in relation to the first sensed parameter, a fourth light responsive sensor having the second operating bandwidth, the fourth sensor modifying light provided to it at a wavelength in relation to the second sensed parameter; and
 a coupler transmitting the light provided by the spectrometer to the first and second sensor arrays.

10. The system of claim 9 wherein the first, second, third and fourth sensors comprise first, second, third and fourth Bragg grating sensors, respectively, and wherein the coupler includes:
 a coupler array for receiving the light provided by the spectrometer;
 a first optical fiber for transmitting the light from the coupler array to the first sensor array, said first and second Bragg grating sensors being connected to the first optical fiber for receiving light transmitted by the first optical fiber and for transmitting light modified by the first and second sensors;
 a second optical fiber for transmitting the light from the coupler array to the second sensor array, said third and fourth Bragg grating sensors being connected to the second optical fiber so that the sensors receive light transmitted by the second optical fiber and so that the second optical fiber transmits light modified by the third and fourth sensors; and
 wherein the detecting circuit detects the light modified by the sensors and transmitted by the first and second optical fibers.

11. The system of claim 2 wherein the detecting circuit comprises:
 a first demodulator and peak detector detecting the light modified by the first and second sensors, determining the peak wavelength of the light modified by the first and second sensors and providing signals representative thereof to the processor; and
 a second demodulator and peak detector for detecting the light modified by the third and fourth sensors, determining the peak wavelength of the light modified by the third and fourth sensors and providing signals representative thereof to the processor.

12. The system of claim 11 wherein the first demodulator and peak detector comprises:
 a differentiator for determining the peak of the light modified by the first and second sensors;
 a threshold detector for rejecting false peaks or noise by determining a minimum amplitude of the light modified by the first and second sensors; and
 logic circuitry responsive to the differentiator and the threshold detector for generating a signal provided to the processor representative of the peak wavelength of the light modified by the first and second sensors.

13. A light source for a system having a sensor array including a first light responsive sensor having a first operating bandwidth wherein the first sensor modifies light provided to it at a wavelength indicative of a first sensed parameter and including a second light responsive sensor having a second operating bandwidth wherein the second bandwidth is different from the first operating bandwidth wherein the second sensor modifies light provided to it at a wavelength indicative of a second sensed parameter, said light source comprising:
 a tunable light source providing light illuminating the sensor array, the light provided to each of the first and second sensors having a wavelength which varies over the first and second bandwidths;
 a detecting circuit for providing a signal representative of light modified by the first and second sensors; and
 a processor for processing the representative signals provided by the detecting circuit to determine the first and second parameters being monitored by the first and second sensors, respectively.

14. The system of claim 13 wherein the tunable light source comprises:

a light source providing output light having a wide bandwidth;

a tunable spectrometer receiving the output light from the light source and providing to the sensors light having a narrow bandwidth which varies according to a control signal; and a controller providing the control signal to the spectrometer and causing the-wavelength of light provided by the spectrometer to vary to include the first and second operating bandwidths of the first and second sensors of the first array.

15. The system of claim 14 wherein the light source comprises an LED and driver, wherein the tunable spectrometer comprises a tunable etalon, wherein the controller comprises an etalon controller controlling the tunable etalon and a waveform generator providing a signal to the etalon controller which causes the etalon to transmit light which varies over the first and second bandwidths, and wherein the coupler array comprises a spliceless distributed coupler array.

16. The system of claim 15 wherein the processor is responsive to the waveform generator whereby the processor differentiates between the signals provided by the sensors based on the wavelength of light provided by the light source as controlled by the waveform generator.

17. A system comprising:

a first light responsive sensor having a first operating bandwidth wherein the first sensor modifies light provided to it at a wavelength indicative of a first sensed parameter;

a second light responsive sensor having a second operating bandwidth wherein the second bandwidth is different from the first operating bandwidth and wherein the second sensor modifies light provided to it at a wavelength indicative of a second sensed parameter;

a light source providing light;

a tunable etalon receiving the provided light and providing illuminating light to the sensors, the illuminating light provided to each of the first and second sensors having a wavelength which varies over the first and second bandwidths;

a detecting circuit for providing a signal representative of light modified by the first and second sensors; and a processor for processing the representative signals provided by the detecting circuit to determine the first and second parameters being monitored by the first and second sensors, respectively.

18. The system of claim 17 further comprising:

a third light responsive sensor having the first operating bandwidth wherein the third sensor modifies light provided to it at a wavelength indicative of the first sensed parameter;

a fourth light responsive sensor having the second operating bandwidth and wherein the fourth sensor modifies light provided to it at a wavelength indicative of the second sensed parameter; and a coupler transmitting the light provided by the tunable etalon to the sensors.

19. The system of claim 18 wherein the first, second, third and fourth sensors comprise first, second, third and fourth Bragg grating sensors, respectively, and wherein the coupler includes:

a coupler array for distributing the illuminating light provided by the etalon;

a first optical fiber for transmitting the light distributed by the coupler array to the first sensor array, said first and second Bragg grating sensors being connected to the first optical fiber for receiving light transmitted by the first optical fiber and for transmitting light modified by the first and second sensors;

a second optical fiber for transmitting the light distributed by the coupler array to the second sensor array, said third and fourth Bragg grating sensors being connected to the second optical fiber so that the sensors receive light transmitted by the second optical fiber and so that the second optical fiber transmits light modified by the third and fourth sensors; and wherein the detecting circuit detects the light modified by the sensors and transmitted by the first and second optical fibers.

* * * * *